US008825548B2

(12) United States Patent
Khan

(10) Patent No.: US 8,825,548 B2
(45) Date of Patent: Sep. 2, 2014

(54) SECURE AUTHENTICATION BETWEEN MULTIPLE PARTIES

(75) Inventor: Khurram Khan, San Jose, CA (US)

(73) Assignee: eBay Inc., San Jose, CA (US)

( * ) Notice: Subject to any disclaimer, the term of this patent is extended or adjusted under 35 U.S.C. 154(b) by 815 days.

(21) Appl. No.: 12/494,652

(22) Filed: Jun. 30, 2009

(65) Prior Publication Data

US 2010/0332391 A1 Dec. 30, 2010

(51) Int. Cl.
*G06Q 20/40* (2012.01)
*G06Q 20/10* (2012.01)
*G06Q 20/04* (2012.01)
*G06Q 30/06* (2012.01)
*G06Q 40/00* (2012.01)

(52) U.S. Cl.
USPC ............... 705/44; 705/39; 705/40; 713/186; 726/6

(58) Field of Classification Search
CPC ....... G06Q 20/40; G06Q 20/10; G06Q 20/04; G06Q 30/06; G06Q 20/02; G06Q 40/00
USPC ....... 705/35, 36 R, 38, 39, 44, 40, 42, 67, 75; 235/386; 340/5.61; 382/124; 704/246, 704/270; 713/156, 168, 183, 186, 182; 726/1, 6; 709/250
See application file for complete search history.

(56) References Cited

U.S. PATENT DOCUMENTS

| | | | | |
|---|---|---|---|---|
| 4,962,530 A | * | 10/1990 | Cairns | 713/183 |
| 5,319,710 A | * | 6/1994 | Atalla et al. | 705/75 |
| 6,144,848 A | * | 11/2000 | Walsh et al. | 455/419 |
| 6,324,526 B1 | * | 11/2001 | D'Agostino | 705/44 |
| 6,782,120 B2 | * | 8/2004 | Modl et al. | 382/124 |
| 6,915,437 B2 | * | 7/2005 | Swander et al. | 726/1 |
| 7,051,002 B2 | * | 5/2006 | Keresman et al. | 705/44 |
| 7,319,987 B1 | * | 1/2008 | Hoffman et al. | 705/44 |
| 7,418,429 B1 | * | 8/2008 | Mok et al. | 705/67 |
| 7,627,472 B2 | * | 12/2009 | Trinkel et al. | 704/246 |
| 2001/0034704 A1 | * | 10/2001 | Farhat et al. | 705/39 |
| 2001/0047326 A1 | * | 11/2001 | Broadbent et al. | 705/38 |
| 2002/0109580 A1 | * | 8/2002 | Shreve et al. | 340/5.61 |
| 2003/0200444 A1 | * | 10/2003 | Sasselli | 713/182 |
| 2004/0034598 A1 | * | 2/2004 | Robinson | 705/44 |
| 2004/0054812 A1 | * | 3/2004 | Liang et al. | 709/250 |
| 2004/0199469 A1 | * | 10/2004 | Barillova et al. | 705/44 |
| 2005/0102211 A1 | * | 5/2005 | Freeny, Jr. | 705/35 |

(Continued)

FOREIGN PATENT DOCUMENTS

EP 1465128 * 10/2004 ............. G07F 19/00

*Primary Examiner* — Barbara Joan Amelunxen
(74) *Attorney, Agent, or Firm* — Haynes and Boone, LLP

(57) ABSTRACT

Systems and methods are disclosed herein to allow a party to a multiple-party transaction to perform authentications using identification information received from another party while allowing the party generating the identification information to maintain confidentiality of information. A user may enter an access code to identify the user to a first party that will be generating identification information to a second party in the transaction. The access code may be entered without requiring the entry of an alphanumeric PIN (Personal Identification Number). The first party may convert the access code to a second code for transmission to the second party so that the access code is not revealed to the second party. The second party may use the second code to authenticate the user, to authenticate a payment transaction or other types of communications from the user or the first party. Thus, parties in a multiple-party transaction may perform authentications while maintaining the confidentiality of information.

20 Claims, 4 Drawing Sheets

(56) References Cited

U.S. PATENT DOCUMENTS

| | | |
|---|---|---|
| 2005/0147225 A1* | 7/2005 | Mallick et al. ............. 379/114.2 |
| 2005/0228675 A1* | 10/2005 | Trinkel et al. ................ 704/270 |
| 2005/0228750 A1* | 10/2005 | Olliphant et al. ............... 705/40 |
| 2006/0036539 A1* | 2/2006 | Tombroff ........................ 705/39 |
| 2006/0282382 A1* | 12/2006 | Balasubramanian et al. .. 705/44 |
| 2007/0011466 A1* | 1/2007 | Imura ........................... 713/186 |
| 2007/0130062 A1* | 6/2007 | Huh ................................ 705/39 |
| 2007/0186116 A1* | 8/2007 | Clemmensen et al. ....... 713/186 |
| 2008/0040285 A1* | 2/2008 | Wankmueller .................. 705/67 |
| 2008/0103972 A1* | 5/2008 | Lanc ............................... 705/44 |
| 2008/0288404 A1* | 11/2008 | Pirzadeh et al. ................ 705/44 |
| 2009/0099961 A1* | 4/2009 | Ogilvy ............................ 705/39 |
| 2009/0104888 A1* | 4/2009 | Cox ............................... 455/410 |
| 2009/0119759 A1* | 5/2009 | Taugbol ............................ 726/6 |
| 2009/0163175 A1* | 6/2009 | Shi et al. ....................... 455/411 |
| 2009/0200375 A1* | 8/2009 | Veshnyakov et al. ......... 235/386 |
| 2009/0259588 A1* | 10/2009 | Lindsay .......................... 705/40 |
| 2009/0299911 A1* | 12/2009 | Abrahams et al. .......... 705/36 R |
| 2010/0095117 A1* | 4/2010 | Shebanow .................... 713/168 |
| 2010/0191960 A1* | 7/2010 | Beck et al. .................... 713/156 |
| 2011/0167002 A1* | 7/2011 | Balasubramanian et al. .. 705/44 |
| 2011/0258116 A1* | 10/2011 | Kemper et al. ................. 705/42 |

\* cited by examiner make payment request using pre-approved amount setup pre-approved money transfer

SECURE AUTHENTICATION BETWEEN MULTIPLE PARTIES

TECHNICAL FIELD

The present disclosure relates generally to online payment transactions. In particular, the present disclosure relates to methods and systems for authentication while maintaining confidentiality of information for online payment transactions involving multiple parties.

BACKGROUND

Online payment transactions have greatly facilitated the purchase of goods, services, and the movement of money over the Internet. In online payment transactions, multiple parties are frequently involved. For example, a user may use a portable device to access a merchant's website to make purchases and to request that payments for the purchases be transferred from the user's account with a payment provider such as PayPal to the merchant's account. To complete the purchase, the user needs to authorize the payment transaction with the payment provider. Authorization of the payment transaction may require the user to enter identification information such as a PIN (Personal Identification Number) that is known only to the user and the payment provider so that the payment provider may authenticate the user. However, there are times when the payment provider may receive the identification information from a third party. For example, a user may desire to make multiple purchases from a merchant at different times. To facilitate online payment transactions for multiple purchases from the same merchant or for scenarios where the user may be unavailable to authorize each payment transaction, it is desirable to allow a user to pre-approve future payment or payments to an online merchant prior to the purchase. Payment pre-approval enables the user to return multiple times to a merchant to make purchases without having to return to the payment provider to authorize a payment for each purchase. To prevent fraudulent purchases by unauthorized users using the pre-approved payment, the payment provider may require identification information of the user from the merchant or other third party for the payment provider to authenticate the transaction. The identification information may be information that is disclosed by the user only to the merchant or other third party such that revealing the identification information to the payment provider may breach the confidentiality of the information. Therefore, it is desirable to enable authentication in transactions involving multiple parties while allowing the parties to maintain the confidentiality of information shared between the parties.

BRIEF SUMMARY

Systems and methods are disclosed herein to allow a party to a multiple-party transaction to perform authentications using identification information received from another party while allowing the party generating the identification information to maintain confidentiality of information not to be shared. A user may enter an access code to identify the user to a first party that will be generating the identification information to a second party in the transaction. The access code may be entered without requiring the entry of an alphanumeric PIN (Personal Identification Number). The first party may convert the access code to a second code representing the identification information for transmission to the second party so that the access code is not revealed to the second party. The second party may use the second code to authenticate the user, to authenticate a payment transaction, or to authenticate other types of communications from the user or the first party. Thus, parties in a multiple-party transaction may perform authentications while maintaining the confidentiality of the access code. For example, a user using a mobile phone to access a merchant's website may identify him/her to the mobile phone using an access code such as a pattern of finger movement over the touch screen, a voice phrase, an image, the user's biometric information, or even the way a phone is moved. The mobile phone converts the access code to an alphanumeric code. The mobile phone transmits the alphanumeric code to the payment provider through the merchant's website such that the payment provider may use the alphanumeric code to authenticate the user for payment transactions. Therefore, the payment provider is able to authenticate the user without requiring the mobile phone to reveal the access code.

In accordance with one or more embodiments of the present disclosure, a payment authentication apparatus includes a processor on a server, and a memory to store machine-readable instructions for execution by the processor to provide a payment authentication application. The payment authentication application receives a payment request PIN of a user from a merchant or a communication device, compares the payment request PIN against a stored PIN of the user to authenticate a payment request. The payment request PIN is derived from an access code received from a consumer and the access code is hidden from the payment authentication application.

In accordance with one or more embodiments of the present disclosure, a method for authenticating a payment request by a payment provider includes receiving a payment request PIN of a user pre-approval key from a merchant or a communication device, where the payment request PIN is derived from an access code that is received from a consumer and the access code is hidden from the payment provider, verifying the payment request PIN against a stored PIN of the user, and approving the payment request.

In accordance with one or more embodiments of the present disclosure, a computer program in a payment authentication device includes a computer readable medium having instruction code for execution by a processor to perform a method. The method includes receiving a payment request PIN of a user from a merchant or a communication device, where the payment request PIN is derived from an access code received from a consumer and the access code is hidden from the computer program product, verifying the payment request PIN of the user against a stored PIN of the user, and approving the payment request.

These and other embodiments of the present disclosure will be more fully understood by reference to the following detailed description of the embodiments when considered in conjunction with the accompanying drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed herein to allow a party to a multiple-party transaction to perform authentications of users, transactions, or other types of communications using identification information received from another party while allowing the party generating the identification information to maintain confidentiality of information when generating the identification information. In multi-party transactions, authentications may have to be performed by a party using information provided by other parties to the transaction. The information passed between multiple parties may contain identification information such as an alphanumerical PIN to enable the receiving party to configure a user account, to authenticate the user against the user account, or to verify the authenticity of a communication. Embodiments of the present disclosure allow the party generating the identification information to derive the identification information from a non-alphanumerical access code selected by the user.

Transmission of the derived identification information instead of the access code allows the generating party to maintain the confidentiality of the access code. For example, a multi-party transaction may involve a user using a portable device to access a merchant's website to make purchases. The user may request that the payment for the purchases be transferred from a pre-approved payment account with a payment provider such as PayPal to the merchant's account. To facilitate payment transactions using the pre-approved payment account, PayPal may not require the user to log on to the user's account to authorize the payment request. Instead, PayPal may authenticate the payment request using identification information received from the merchant's website or the portable device. Therefore, the merchant's website or the portable device may request the user to enter an access code.

The access code selected by the user may be a pattern of finger movement over the touch screen, a voice phrase, an image, biometric information such as fingerprints, or even the way the portable device is moved. The merchant's website or the portable device may convert the access code into an alphanumerical PIN code for transmission to PayPal. When the user initially signed up for the pre-approved payment account, PayPal had also stored the alphanumerical PIN code for configuring the account. Thus, PayPal verifies the received alphanumerical PIN code against the stored alphanumerical PIN code to authenticate the payment request while allowing the merchant's website or the portable device to maintain the confidentiality of the access code.

Figure 1:
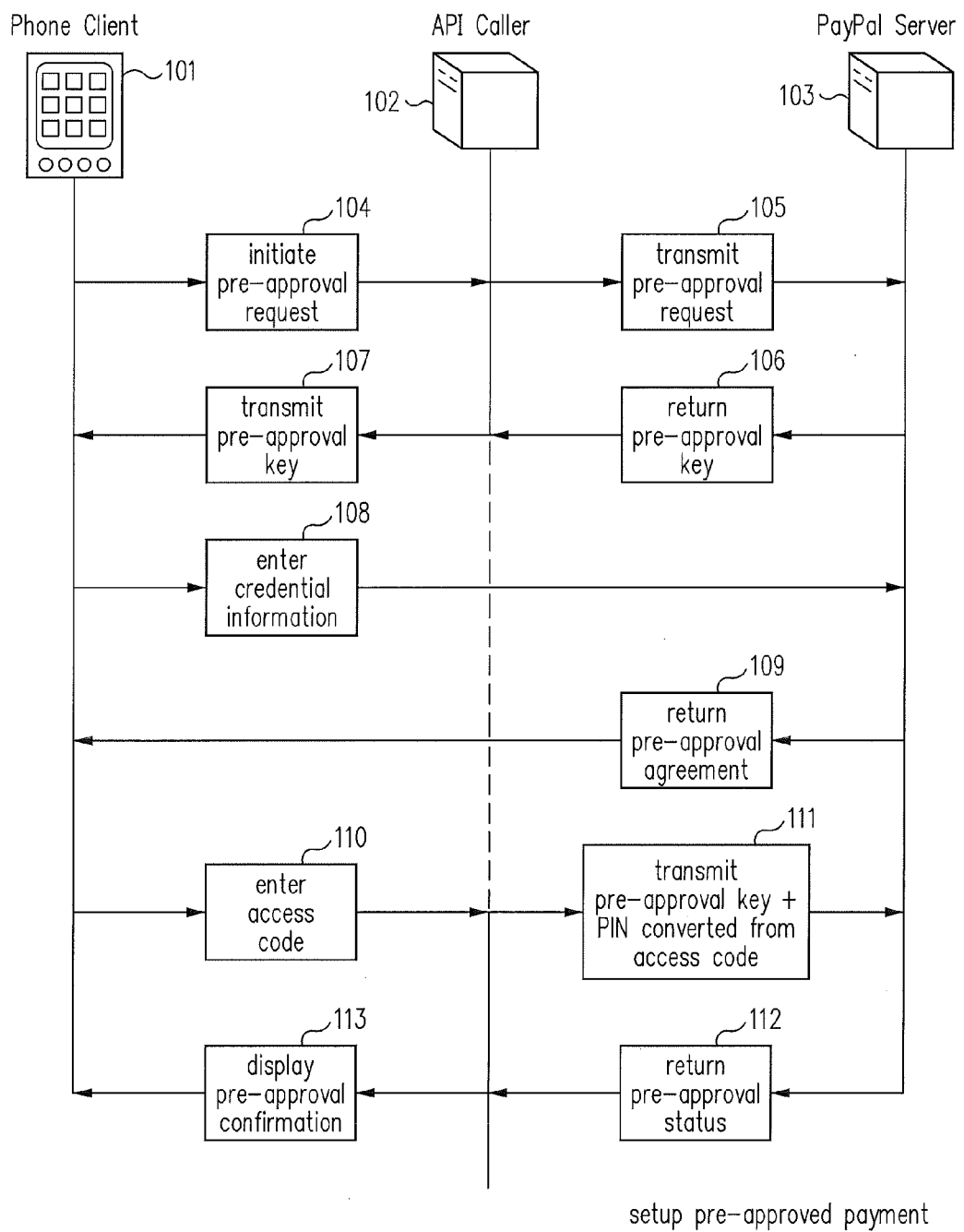
FIG. 1 shows transactions between multiple parties to set up a pre-approved payment with a payment provider using a PIN derived from an access code according to one or more embodiments of the present disclosure.

FIG. 1 shows transactions between multiple parties to set up pre-approved payments with a payment provider using a PIN derived from an access code according to one or more embodiments of the present disclosure. The multiple parties are a phone client 101, an API caller 102 representing a merchant website or a phone client website acting as a facilitator for a merchant, and a payment provider such as the PayPal server 103. A user using the phone client 101 accesses API caller 102 and makes purchases through API caller 102 using PayPal server 103 as the payment provider. In the conventional case of a single transaction with no pre-approved payments, the user is asked to log-in to the user's PayPal account to authorize a payment or, for a new user, asked to establish an account before the user may request payment authorization. The user may establish an account and/or log-in using a PIN that is known only to the user and PayPal server 103 and may interact directly with PayPal server 103 to authorize the payment. Alternatively, the user may desire to make multiple purchases through API caller 102 over a period of time.

To facilitate multiple purchases through API caller 102 without requiring the user to log-in to PayPal server 103 to authorize each purchase payment, it may be convenient for the user to request a pre-approval amount to be applied for future purchases. Thereafter, when the user makes a purchase through API caller 102, API caller 102 may interact with PayPal server 103 to authorize the payment using the pre-approved amount. Because the user does not interact directly with PayPal 103 to authorize payments using the pre-approved payment, API caller 102 may have to provide identification information of the user to PayPal server 103 to enable PayPal server 103 to authenticate the user and the transaction.

In one or more embodiments of the present invention, the phone client 101 generates the identification information from a user-entered access code and transmits the identification information to PayPal server 103 through API caller 102. The access code is confidential to the phone client 101 and generation and transmission of the identification information rather than the access code allows the phone client 101 to maintain the confidentiality of the access code while enabling PayPal sever 103 to authenticate the transaction. The phone client 101 also generates the identification information from the access code and transmits the identification information to PayPal server 103 when the user initially requests the pre-approved amount from PayPal server 103. PayPal server 103 then stores the identification information to associate the user with the pre-approved amount so that PayPal server 103 may authenticate the user when the user makes future payment requests using the pre-approved amount.

In step 104, the user using the phone client 101 connects with API caller 102 to initiate the pre-approval request. The phone client 101 may be a Google G1 phone, an iPhone, other types of smart phones, a PDA, a laptop, or other types of communication devices. API caller 102 displays a screen on the phone client 101 for the user to sign up for the pre-approved payment through PayPal. The user may elect to sign up for the pre-approved payment and may be requested to fill out payment constraint information on API caller 102. Payment constraint information allow the user to customize the pre-approval request by, for example, allowing the user to set limits on the total pre-approved amount, the maximum amount per transaction, or to specify an expiration date etc. API caller 102 makes a pre-approval API call to PayPal sever 103 to transmit the pre-approval request in step 105.

PayPal server 103 processes the pre-approval request and returns back a pre-approval key in step 106 to API caller 102. The pre-approval key can be considered a token returned by the PayPal server 103 to uniquely identify the pre-approved payment associated with the pre-approval request for future purchases. This pre-approval key is to be submitted to PayPal server 103 when the user makes future payment requests to PayPal Server 103 to authorize purchase payments using the pre-approved payment. PayPal sever 103 may also return a pre-approval URL to API caller 102. API caller 102 transmits the pre-approval key and the pre-approval URL back to the phone client in step 107. The pre-approval URL directs the user to the PayPal server 103 and the user is prompted to enter credential information for the pre-approval agreement. If the user does not have an account with PayPal, the user will be asked to establish an account name and a password. Otherwise, the user will be asked to log-in to the user's PayPal account. The phone client 101 then makes an API authentication call to PayPal 103 to transmit the credential information in step 108.

PayPal server 103 processes the credential information and responds with confirmation status information and details of the pre-approval agreement in step 109. Phone client 101 then displays the confirmation status and details of the pre-approval agreement to the user for approval. The details of the pre-approval agreement may include the payment constraint information the user entered earlier in step 104 such as the total pre-approved amount, the expiration date, and the maximum amount per transaction. The pre-approval agreement may require the user to enter a PIN to allow PayPal server 103 to associate the user with the pre-approved payment so that PayPal server 103 may authenticate future purchases made by the user using the pre-approved payment. As mentioned, the PIN may be generated from an access code to maintain the confidentiality of the access code.

In step 110, user approves the pre-approval agreement and enters an access code. The access code may be a pattern of finger movement over the touch screen, a voice phrase, an image, biometric information such as fingerprints, or even the way the portable device is moved. Phone client 101 may convert the access code to a PIN and transmit the PIN along with the user's approval of the pre-approval agreement to API caller 102. Alternatively, phone client 101 may transmit the access code to API caller 102 for API caller 102 to convert the access code to the PIN. In step 111 API caller 102 makes another API call to PayPal server 103 to transmit the pre-approval key and the PIN to PayPal server 103. PayPal server 103 processes the API call, stores the PIN, associates the pre-approval key with the PIN, and returns pre-approval status in step 112 to API caller 102. Finally, API caller 102 displays a pre-approval confirmation page to phone client 101 in step 113.

Figure 2:
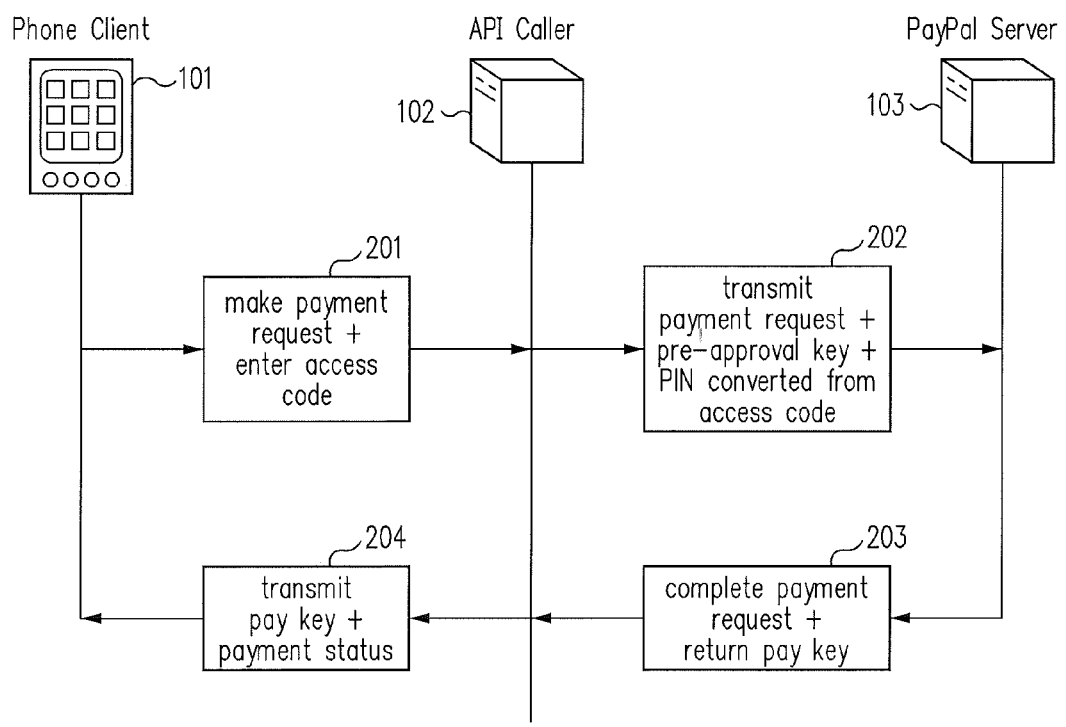
FIG. 2 shows transactions between multiple parties when an user makes a payment using a pre-approved amount according to one or more embodiments of the present disclosure.

FIG. 2 shows transactions between multiple parties when a user makes a payment request using the pre-approved payment according to one or more embodiments of the present disclosure. After the user has signed up with a payment provider for a pre-approved payment to be used with a merchant, the user may proceed to make purchases from the merchant. The multiple parties are again a phone client 101, an API caller 102 representing a merchant website or a phone client website acting as a facilitator for a merchant, and a payment provider such as the PayPal server 103. To facilitate the transaction, API caller 102 may interact with PayPal server 103 to authorize payments using the pre-approved payment. Because the user does not interact directly with PayPal 103 to authorize payments, API caller 102 has to provide a PIN to PayPal server 103 to enable PayPal server 103 to authenticate the user and the transaction. This PIN is the same PIN that was received by PayPal server 103 when the user initially signs up for the pre-approved payment. The PIN is also generated from the same access code entered when the user initially signs up for the pre-approved payment in order to maintain the confidentiality of the access code.

In step 201, the user using the phone client 101 connects with the API caller 102 to select items for purchase. When the user is ready to make the purchase, the phone client 101 may display a screen to allow the user to pay using the pre-approved payment from PayPal. When the user makes a payment request to use the pre-approved payment, the phone client 101 prompts the user to enter the access code. The user enters the same access code that was entered when the user signed up for the pre-approval amount. As before, the access code may be a pattern of finger movement over the touch screen, a voice phrase, an image, biometric information such as fingerprints, or even the way the portable device is moved. As before, phone client 101 may convert the access code to a PIN and transmit the PIN to API caller 102. Alternatively, phone client 101 may transmit the access code to API caller 102 for API caller 102 to convert the access code to the PIN.

In step 202, API caller 102 makes an API call with the payment request, the PIN, and the pre-approval key received during the pre-approval request process to PayPal server 103. PayPal server 103 uses the PIN and the pre-approval key to authenticate the user and to process the payment request. Upon approval, PayPal server 103 transfers the payment to complete the payment request, and responds with payment status and a pay key in step 203. In step 204, API caller 102 transmits the payment status and a pay key to the phone client 101. The pay key is considered a token returned by PayPal server 103 to uniquely identify the payment request. Upon receiving the payment status and the pay key, the phone client 101 displays a confirmation page to the user.

Figure 3:
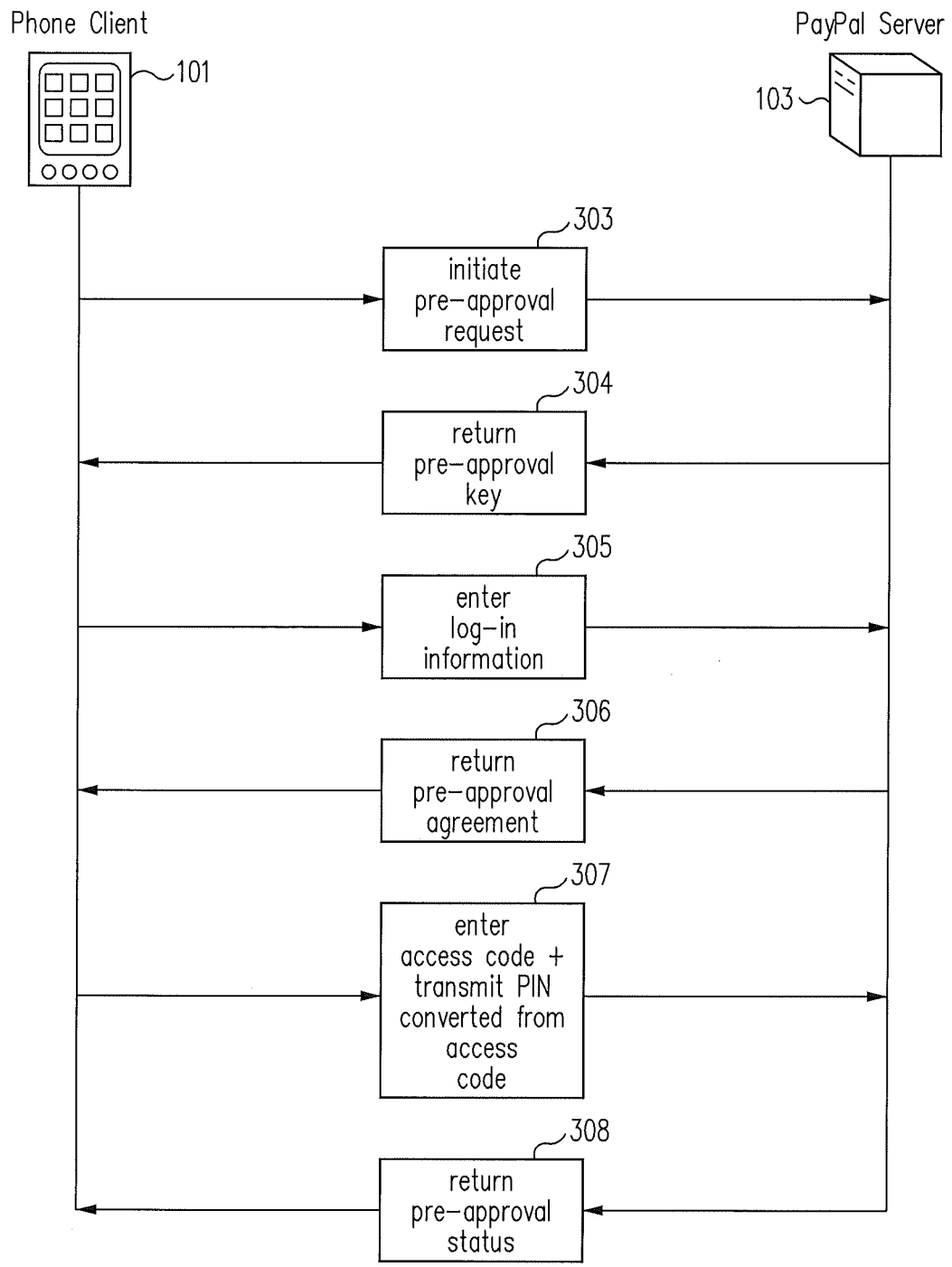
FIG. 3 shows transactions between multiple parties to set up pre-approved money transfer with a payment provider using a PIN derived from an access code according to one or more embodiments of the present disclosure.

FIG. 3 shows transactions between multiple parties to set up a pre-approved money transfer with a payment provider using a PIN derived from an access code according to one or more embodiments of the present disclosure. A pre-approved money transfer may be used in scenario where a payment account owner wants another party, called the sender, to have restricted access right to send money from the payment account owner's PayPal account on behalf of the payment account owner without requiring the sender to log-in to the payment account owner's PayPal account. Of course, a payment-approved money transfer may also be initiated by the payment account owner when it's inconvenient for the payment account owner to log-in to the owner's PayPal account. Pre-approved money transfer differs from the pre-approved payment of FIGS. 1 and 2 in that the sender transfers money from the payment account owner's PayPal account without calling explicitly for the exchange of goods or services. Thus, a merchant may not necessarily be a party to the transactions, although it can be.

Figure 4:
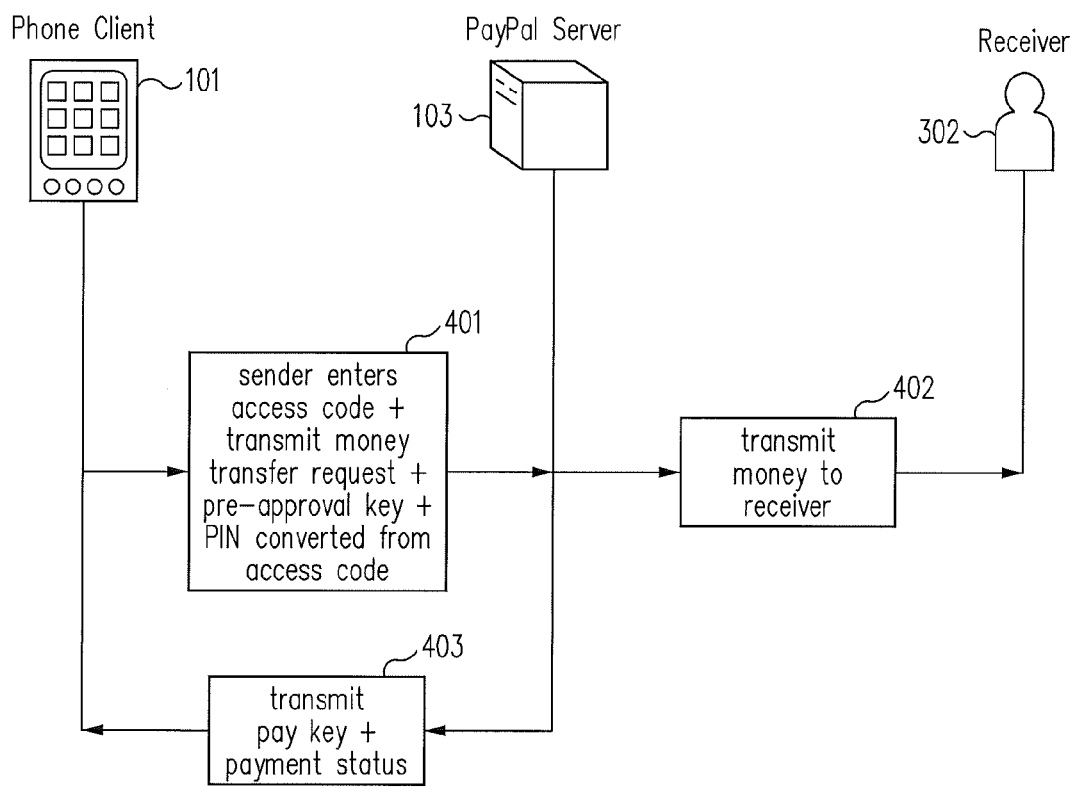
FIG. 4 shows transactions between multiple parties when a sender makes a money transfer request on behalf of the payment account holder to a receiver using pre-approved money according to one or more embodiments of the present disclosure.

The multiple parties are a phone client 101, a receiver 302 of FIG. 4, and a payment provider such as the PayPal server 103. The phone client 101 may be used initially by the PayPal account owner to request pre-approval of the money transfer and also by the sender to make money transfer requests on behalf of the PayPal account owner to the receiver 302. Because the sender interacts with PayPal server 103 to authorize money transfer using the pre-approved money without logging into the PayPal account holder's account, the sender may have to provide identification information of the payment account holder to enable PayPal server 103 to authenticate the money transfer request.

In one or more embodiments of the present invention, the phone client 101 generates the identification information from a sender-entered access code and transmits the identification information to PayPal server 103. Similar to the pre-approved payment scenario, the access code is confidential to the phone client 101 and transmission of the identification information rather than the access code allows the phone client 101 to maintain the confidentiality of the access code while enabling PayPal sever 103 to authenticate the request. The phone client 101 also generates the identification information from the access code and transmits the identification information to PayPal server 103 when the PayPal account holder initially signs up for the pre-approved money transfer from PayPal server 103. PayPal server 103 then stores the identification information to associate the PayPal account holder with the pre-approved money transfer amount so that PayPal server 103 may authenticate a sender with knowledge of the access code when the sender make future money transfer requests using the pre-approved money.

In step 303, the PayPal account holder using the phone client 101 connects with PayPal server 103 to initiate the pre-approval request. PayPal server 101 displays a screen on the phone client 101 for the user to sign up for the pre-approved money transfer through PayPal. The PayPal account holder may elect to sign up for the pre-approved money transfer and may be requested to fill out transfer constraint information on PayPal server 103. The transfer constraint information allows the user to customize the pre-approval request by, for example, allowing the user to set limits on the total pre-approved amount, the maximum amount per transfer, or to specify an expiration date etc.

Phone client 101 makes a pre-approval API call to PayPal sever 103 to transmit the pre-approval request with the transfer constraint information. PayPal server 103 processes the pre-approval request and returns back a pre-approval key in step 304 to phone client 101. The pre-approval key can be considered a token returned by PayPal server 103 to uniquely identify the pre-approved amount associated with the pre-approval request for future money transfers. This pre-approval key is to be submitted to PayPal server 103 when the sender makes future requests to PayPal Server 103 to authorize money transfer using the pre-approved payment. The PayPal account holder is prompted to login to the account holder's PayPal account. The phone client 101 then makes an API authentication call to transmit the login information to PayPal 103 in step 305. PayPal server 103 processes the login information and responds with confirmation status information and details of the pre-approval agreement in step 306. Phone client 101 then displays the confirmation status and details of the pre-approval agreement to the PayPal account holder for approval.

The details of the pre-approval agreement may include the transfer constraint information the user entered earlier in step 303 such as the total pre-approved amount, the expiration date, and the maximum amount per transfer. The pre-approval agreement may require the user to enter a PIN to allow PayPal server 103 to associate the PayPal account holder with the pre-approved money transfer so that PayPal server 103 may authenticate future money transfer requests made by the PayPal account holder or the sender. As before, the PIN may be generated from an access code to maintain the confidentiality of the access code. In step 307, the PayPal account holder approves the pre-approval agreement and enters an access code. As before, the access code may be a pattern of finger movement over the touch screen, a voice phrase, an image, biometric information such as fingerprints, or even the way the portable device is moved. Phone client 101 may convert the access code to a PIN and make an API call to transmit the PIN along with the pre-approval key to PayPal server 103. PayPal server 103 processes the API call, stores the PIN, associates the pre-approval key with the PIN, and returns pre-approval status in step 308 to the phone client 101 for the phone client 101 to display a pre-approval confirmation to the PayPal account holder.

FIG. 4 shows transactions between multiple parties when a sender makes a money transfer request on behalf of the payment account holder to a receiver using pre-approved money according to one or more embodiments of the present disclosure. After the payment account holder has signed up with a payment provider for pre-approved transfer money, the sender may have restricted access right to transfer money from the payment account holder's account on behalf of the payment account holder. The multiple parties are a phone client 101, a receiver 302, and a payment provider such as the PayPal server 103. Because the sender does not log into a PayPal account holder's account to authorize money transfer, the sender has to provide a PIN to PayPal server 103 to enable PayPal server 103 to authenticate the sender and the money transfer. This PIN is the same PIN that was received by PayPal server 103 when the PayPal account holder initially signs up for the pre-approved money transfer. The PIN is also generated from the same access code entered by the PayPal account holder when the PayPal account holder initially signs up for the pre-approved money transfer in order to maintain the confidentiality of the access code.

In step 401, the sender using the phone client 101 connects with the PayPal server 102 to request money transfer on behalf of the PayPal account holder. The phone client 101 may display a screen to allow the sender to request money transfer using the pre-approved transfer money from PayPal. When the sender makes a money transfer request to use the pre-approved money, the phone client 101 prompts the sender to enter the access code. The sender enters the same access code that was entered when the PayPal account holder initially signed up for the pre-approval money. As before, the access code may be a pattern of finger movement over the touch screen, a voice phrase, an image, biometric information such as fingerprints, or even the way the portable device is moved.

Phone client 101 may convert the access code to a PIN and make an API call with the money transfer request, the PIN, and the pre-approval key received during the pre-approval request process to PayPal server 103. PayPal server 103 uses the PIN and the pre-approval key to authenticate the user and to process the money transfer request. Upon approval, PayPal server 103 transfers money from the PayPal account holder's account to the receiver 302 in step 402 to complete the transfer request, and responds with payment status and a pay key in step 403. The pay key is considered a token returned by PayPal server 103 to uniquely identify the money transfer request. Upon receiving the payment status and the pay key, the phone client 101 display a confirmation page to the sender.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the present disclosure, such as program code and/or data for processing the payment or money transfer request, may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, use of a non-alphanumeric access code with a phone client is described; however other types of access code may also be suitable for use on other types of hardware platform. In addition, although PayPal is used as the payment service provider in the embodiments, any suitable on-line payment provider or financial services provider may be used to process pre-approval, payment, or money transfer requests from the hardware platform. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

I claim:

1. A payment authentication apparatus comprising:
a processor on a server; and
a memory adapted to store a plurality of machine-readable instructions of a payment authentication application for the server wherein the instructions are executed by the processor to:
receive a payment pre-approval request from a pre-approval requester;
process the payment pre-approval request to generate a pre-approval key, wherein the pre-approval key uniquely identifies the pre-approval request;
transmit the pre-approval key to the pre-approval requester;
receive credential information comprising an account name and a password for an account holder from a user device;
verify the account holder based on the credential information;
request a PIN (Personal Identification Number) from the user device, wherein the PIN is used to authenticate use of the pre-approval key for one or more future payments made from an account of the account holder;
receive the pre-approval key and the PIN generated by the user device, wherein the PIN is derived from an access code entered into the user device;
associate the PIN with the pre-approval key to pre-approve one or more future payments made from the account of the account holder;
receive a payment request including the PIN and the pre-approval key;
verify that the PIN is associated with the pre-approval key to authenticate the payment request to approve a payment made from the account of the account holder without requiring the credential information of the account holder from the payment requester; and
transfer a payment from the account of the account holder.

2. The payment authentication apparatus of claim 1, wherein the payment authentication application is from a payment provider, the pre-approval requester and the payment requester is a communication device of a merchant, and the payment is made from the account of the account holder to the merchant.

3. The payment authentication apparatus of claim 1, wherein the payment authentication application is from a payment provider, and the pre-approval requester and the payment requester are the user device.

4. The payment authentication apparatus of claim 1, wherein the access code is not entered alphanumerically into the user device.

5. The payment authentication apparatus of claim 4, wherein the access code comprises a pattern of finger movement of a user entered into the user device.

6. The payment authentication apparatus of claim 4, wherein the access code comprises biometric information of a user entered into the user device.

7. The payment authentication apparatus of claim 1, wherein the payment pre-approval request includes payment constraint information to set limits on the one or more future payments made from the account of the account holder.

8. The payment authentication apparatus of claim 1, wherein the instructions are further executed by the processor to transmit a pay key to the payment requester to identify the payment request.

9. A method of authenticating a payment request by a payment provider, comprising:
receiving a payment pre-approval request from a pre-approval requester by a server of the payment provider;
processing the payment pre-approval request to generate a pre-approval key, wherein the pre-approval key uniquely identifies the pre-approval request;
transmitting the pre-approval key to the pre-approval requester;
receiving credential information comprising an account name and a password for an account holder from a user device;
verifying the account holder based on the credential information;
requesting a PIN (Personal Identification Number) from the user device, wherein the PIN is used to authenticate use of the pre-approval key for one or more future payments made from an account of the account holder;
receiving the pre-approval key and the PIN generated by the user device, wherein the PIN is derived from an access code entered into the user device;
associating the PIN with the pre-approval key to pre-approve one or more future payments made from the account of the account holder;
receiving a payment request including the PIN and the pre-approval key;
verifying that the PIN is associated with the pre-approval key to authenticate the payment request without requiring the credential information of the account holder from the payment requester; and
transferring a payment from the account of the account holder.

10. The method of claim 9, wherein the pre-approval requester and the payment requester is a communication device of a merchant, and the payment is made from the account of the account holder to the merchant.

11. The method of claim 9, wherein the pre-approval requester and the payment requester are the user device.

12. The method of claim 9, wherein the access code is not entered alphanumerically into the user device.

13. The method of claim 12, wherein the access code comprises a pattern of finger movement of a user entered into the user device.

14. The method of claim 12, wherein the access code comprises biometric information of a user entered into the user device.

15. The method of claim 9, further comprising receiving payment constraint information from the pre-approval requester to set limits on the one or more future payments made from the account of the account holder.

16. The method of claim 9, further comprising transmitting a pay key to the payment requester to identify the payment request.

17. A non-transitory machine readable medium adapted to store a plurality of machine readable instructions which when executed by one or more processors of a server are adapted to cause the server to perform a method comprising:

receiving a payment pre-approval request from a pre-approval requester;

processing the payment pre-approval request to generate a pre-approval key, wherein the pre-approval key uniquely identifies the pre-approval request;

transmitting the pre-approval key to the pre-approval requester;

receiving credential information comprising an account name and a password for an account holder from a user device;

verifying the account holder based on the credential information;

requesting a PIN (Personal Identification Number) from the user device, wherein the PIN is used to authenticate use of the pre-approval key for one or more future payments made from an account of the account holder;

receiving the pre-approval key and the PIN generated by the user device, wherein the PIN is derived from an access code entered into the user device;

associating the PIN with the pre-approval key to pre-approve one or more future payments made from the account of the account holder;

receiving a payment request including the PIN and the pre-approval key;

verifying that the PIN is associated with the pre-approval key to authenticate the payment request without requiring the credential information of the account holder from the payment requester; and transferring a payment from the account of the account holder.

18. The non-transitory machine readable medium of claim 17, wherein the pre-approval requester and the payment requester is a communication device of a merchant, and the payment is made from the account of the account holder to the merchant.

19. The non-transitory machine readable medium of claim 17, wherein the pre-approval requester and the payment requester are the user device.

20. The non-transitory machine readable medium of claim 17, wherein the method further comprises transmitting a pay key to the payment requester to identify the payment request.

* * * * *